(No Model.)
2 Sheets—Sheet 1.
A. B. ARNOLD.
CAR BRAKE AND STARTER.
No. 406,382. Patented July 2, 1889.
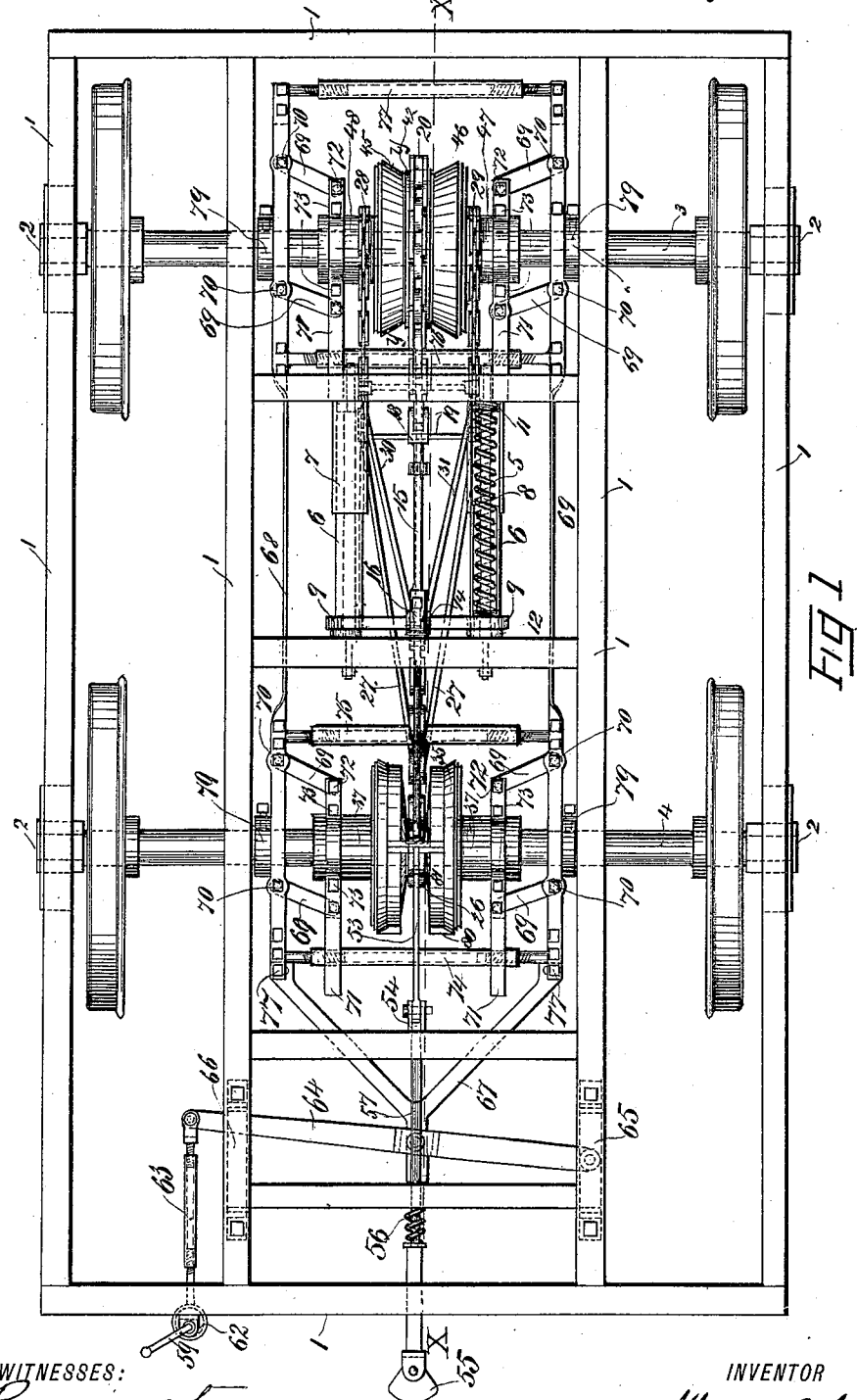

(No Model.) 2 Sheets—Sheet 2.
A. B. ARNOLD.
CAR BRAKE AND STARTER.
No. 406,382. Patented July 2, 1889.
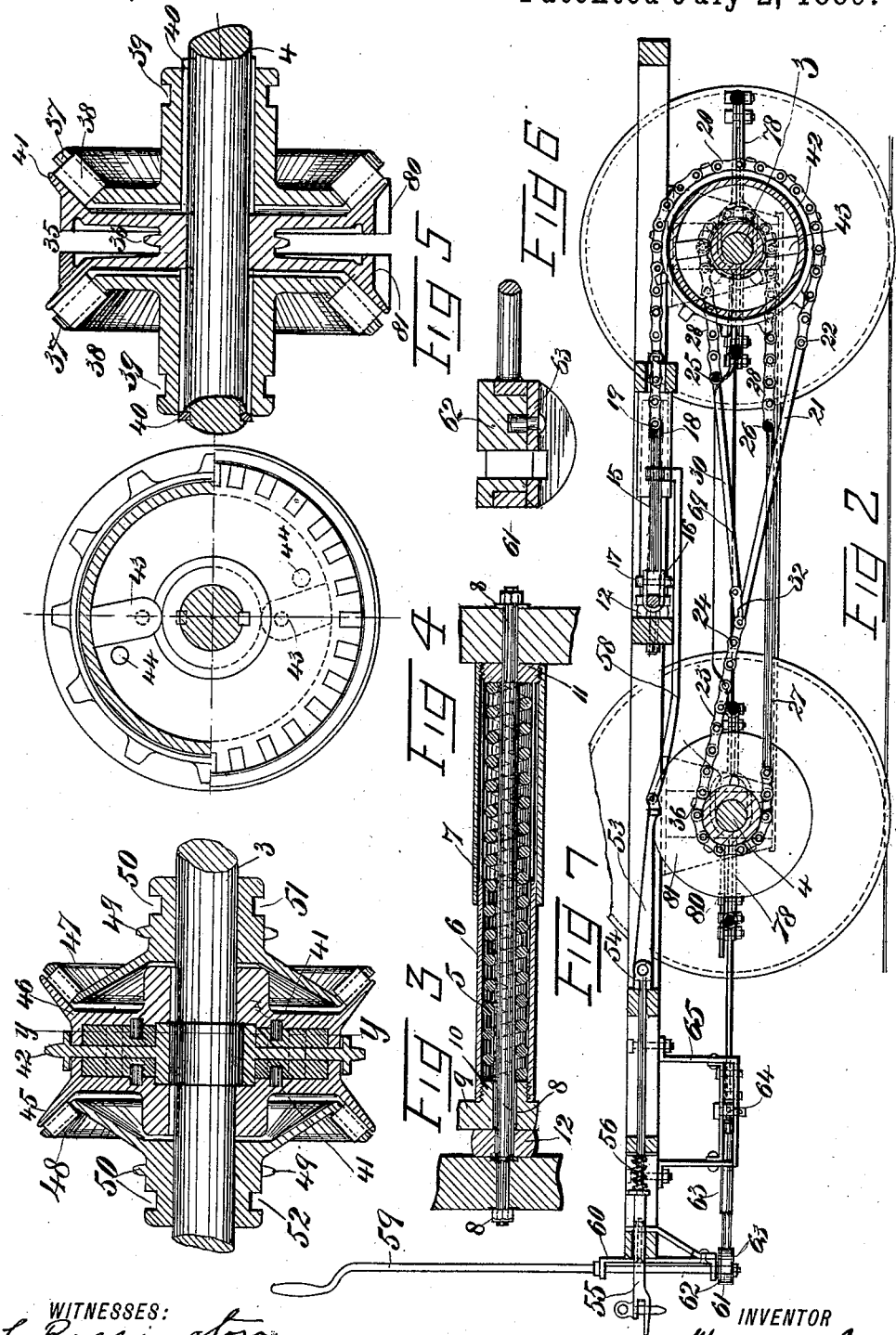
WITNESSES:
A. C. Brasington
W. C. Brasington
INVENTOR
Alfred B. Arnold
BY
J. R. Bell
ATTORNEY

UNITED STATES PATENT OFFICE.

ALFRED B. ARNOLD, OF COLUMBUS, INDIANA, ASSIGNOR OF FIVE-EIGHTHS TO THE ARNOLD CAR BRAKE AND STARTER COMPANY, OF SAME PLACE.

CAR BRAKE AND STARTER.

SPECIFICATION forming part of Letters Patent No. 406,382, dated July 2, 1889.

Application filed July 16, 1888. Serial No. 280,114. (No model.)

*To all whom it may concern:*

Be it known that I, ALFRED B. ARNOLD, a citizen of the United States, residing at Columbus, in the county of Bartholomew, State of Indiana, have invented new and useful Improvements in Car Brakes and Starters, of which the following is a specification.

My invention relates to certain improvements in car brakes and starters similar in character to that described in an application filed by me on the 31st day of December, 1883; and it consists of certain improvements and novel details of construction and operation, as hereinafter described.

My invention is fully illustrated in the accompanying drawings, in which—

Figure 1 is a plan. Fig. 2 is a longitudinal sectional elevation through $x\ x$, Fig. 1. Fig. 3 is an enlarged transverse sectional view of clutch and pawl-disk. Fig. 4 is an end elevation of said pawl-disk, top half being a sectional view through the lines $y\ y$, Fig. 3. Fig. 5 is a transverse sectional elevation of forward sprocket-spool and clutch. Fig. 6 is a perspective view of brake-shaft eccentric and strap, and Fig. 7 is an enlarged section of accumulator-springs and casing, showing a portion of end of cross-head in section.

Similar numbers refer to similar parts throughout the several views.

1 designates the main framing of car, provided with suitable journal-boxes 2 and mounted on axles 3 and 4, on which are secured the carrying-wheels.

5 designates the horizontal accumulator compression-springs (both of which are alike) incased in the telescope-covers 6 and 7 and encircling the cross-head guide-rods 8, said rods having their ends reduced where inserted into frame to receive a washer, which forms a wide bearing-shoulder against the yielding surface of wooden cross-beams, to which the rods are secured by nuts, in the manner shown.

9 designates the accumulator cross-head provided with the threaded bosses 10, screwed firmly into casing 6.

15 designates the main connecting-rod intermediate between the accumulator-springs and receiving at its forward end the intermediate cross-head bearing 14 and swinging loosely thereon, and having the strap 16 removably secured to stub of the rod by bolt and nut 17, and the fork 18 formed on its rear end to receive and loosely embrace main chain 20. Said chain, secured by the pin 19, passes around a portion of the periphery and, engaging with the sprocket-teeth of wheel 42, is secured at its other extremity to the rod 21 by the pin 22.

23 designates the forward chain partially surrounding spool 35 and, engaging with teeth 36 on periphery of barrel of spool, is loosely jointed to rod 21 by the rivet 24 on one end and the angle-rods 27 by a similar rivet. The back chains 28 and 29, secured to angle-rods 30 and 31 by the distance-rod 25 and passing around and engaging with exterior sprockets 49 and 50, are secured to the end eye of angle-rods 27, said rods secured at their forward ends by the links 32, hinged to rod 21 at its forward end by pins, in the manner shown. The distance-rods 25 and 26 maintain the chains 28 and 29 in a direct line with the outer sprockets and prevent chain from climbing teeth. A flange may be formed on each side of teeth of this sprocket to further facilitate the chains meshing with the sprocket-teeth.

35, in Fig. 5, designates the mitered friction-clutch and sprocket-spool mounted loosely on axle 4 intermediate between wheels, and held in position by the adjacent keys 40, and having sprocket-teeth 36 arranged around its periphery, for the purpose hereinbefore described.

37 designates the outer friction-clutches mounted on axle 4 adapted to turn therewith, slide longitudinally thereon, and to engage with the sprocket-spool clutch 35, and being provided with (on their mitered surfaces) the removable friction-cogs 38 and the grooves 39 to receive clutch-straps 71, for the purpose hereinafter described. The clutches are preferably made of cast-iron, and in my experience I consider wooden cogs inserted in clutch in the manner shown in the drawings to be the better material for this purpose. Paper, or even the iron surfaces of the clutches, may be used as contact-surfaces with very good results.

12 is a rubber bumper-spring for the purpose of absorbing the blow of the reservoirspring cross-head when it arrives at the end of its stroke.

42 designates the main sprocket-wheel, mounted loosely on axle 3, intermediate between the axle-wheel and in line with forward sprocket-spool 35, and carrying the gravity friction-pawls 43, limited in their motion by pins 44, passing through web of sprocket-wheel, as shown, and are provided with dowel-pins 41 at their centers of oscillation to maintain them in their bearings.

45 and 46 designate the friction disk-clutches secured to axle 3 by the keys 47 butting against large portion or shoulder thereof, and counterbored to receive ends of hub of sprocket-wheel 42, thus forming a complete covering holding pawls in position and excluding dust or snow from friction-surface of inner flange of clutches 45 and 46 and pawls 43.

47 and 48 are friction-clutches of a character similar to those of 35, mounted loosely on axle 4, and having sprockets 49 and 50 formed on the peripheries of their wheels, and the grooves 51 and 52, for the purpose hereinafter described.

53 designates the stop-lever fulcrumed at its forward end to the prolonged end of draw-bar at 54, and is provided with an eye to receive auxiliary connecting-rod.

55 designates a draw-bar having a portion of its length reduced to form a shoulder and receiving a collar to sustain the pressure of auxiliary compression-spring 56, said bar being provided with a fork to receive the stop-lever 53 jointed thereto.

59 designates the brake-shaft and handle of the usual form carried by the standard 60 and rotating in suitable bearings, and having its bottom end forged square to receive the eccentric 62 and plate 63, all being secured to shaft by the screw-nut 61, as shown. The brake-rod 63 is formed by uniting the screwed arm of eccentric-strap and brake-lever fork by a tube having its corresponding ends screwed, one right, the other left, to receive the stubs.

The brake-lever 64, fulcrumed in the fulcrum 65, is supported and guided at its opposite end by the brace-guide 66, and jointed at a point intermediate between its ends to the angle-frame, said frame being provided with draw-holes at its ends, for the purpose hereinafter described.

68 represents the toggle-frame, having its upper member twisted in the manner shown to secure rigidity in a vertical direction and arched over forward and rear axles and bolted to the under-arched member, thus surrounding axles and receiving between them the outer ends of the toggles 69, swinging on the bolts 70 and clamping firmly the adjustable cross-braces 74, 75, 76, and 77, formed by the right and left hand screwed stubs and the tubes correspondingly threaded to receive them. The inner ends of toggles are pivotally secured to the clutch-strap 71 by the bolts 72, said strap consisting of two parts firmly secured together and loosely fitting the friction-clutch slots 39 and 52. The cross-braces 74 and 76 receive the prolonged ends of clutch-strap for the purpose of preventing twist at joints of toggles, consequent on the friction produced between the surface of clutch-strap and groove, when clutches are in contact, provision being made to take up the wear of friction-clutches by the aforementioned adjustable cross-braces; and in consequence of this transverse adjustment I provide the angle-frame 67 with the draw-holes in and along which the securing-bolts 77 move as the frames 68 and 69 are drawn closer together. The washers or collars 79, secured to the axles 3 and 4 by set-screws, or in any suitable manner, are for the purpose of maintaining the toggle-frame in a central position relative to the length of the axles while clutches are being moved in and out of contact.

The operation of my machine is as follows: When it is desired to stop the moving car, the operator throws the friction-clutches into contact by means of the brake-handle 59 and its eccentric 62, the eccentricity of which regulates the amount of motion of end of lever connected by the brake-rod 63. The toggle-frame being rigidly connected and joined to brake-lever 64, advances a distance proportioned to the amount of the throw of lever. The toggle-frame being thus moved, causes the toggles 69 gradually to approach a position perpendicular with itself, and thus force outer clutches inward and in contact with its component part. The sprocket-wheels and spool being thus held rigidly to the axle, revolve with it, and thus compress the accumulator-springs, through the chains and their connecting-rods, an amount proportional to the momentum of the moving car. When it is desirable to start the car, it is only necessary to release the clutches in the manner reverse to that used in applying the brakes. The clutches being now released, the force stored up in the accumulator-springs is now transmitted, through the chain and its connections, to the sprocket-wheel carrying the pawls 43. Said pawls, engaging with the inner surface of clutch-rim, propel the car forward.

It will be seen that the pawl is negative in its action when car is moved forward and positive when moved backward, thus effectually preventing car from running backward or down an incline.

I provide an auxiliary spring on draw-bars, hereinbefore described, for the purpose of assisting main springs when excessively compressed. Said spring, being connected to main connecting-rod by an auxiliary connecting-rod 58, relieves the chains, connecting-rods, and their connections from excessive strain, as hereinafter described.

It will be seen that the manner in which I connect the draw-bar to the cross-head is of great importance, for in the event of the car failing to start voluntarily, if a pulling-force be applied to the draw-bar it will be transmitted to the periphery of the rear sprocket-wheels, thus exerting an additional leverage-power on wheels and materially assisting the starting of the car.

I arrange the chains and their connections in the manner shown in the drawings, Figs. 1 and 2, for the purpose of equalizing the strain that is brought to bear on them when stopping and starting the car over both the car-axles and their mountings.

The auxiliary connecting-rod 58, jointed at its forward end to the stop-lever eye, as hereinbefore described, and having formed on its rear end a loop loosely embracing main rod 15, is arranged so that main-rod stub in its backward motion shall come in contact with it at a point of its stroke at which the accumulator-springs have almost received their full amount of compression. As the aforementioned accumulator-springs are still further compressed, the auxiliary rod 58, jointed to stop-lever 53, forms a connecting-link to the draw-bar and will recede with it, thus compressing the auxiliary spring 56. When the accumulator-springs are still further compressed to within a small fraction of the limit of their stroke, the stop 80 will be in contact with the toes of the stop-lever 53, thus locking the forward axle and avoiding an undue strain to be applied to the accumulator-springs. The flange 81 on clutch 53 causes the stop-lever toes to maintain the same position relative to the axle.

Tensile accumulator-springs may be substituted for those of the nature described. I find by experience that springs of this class do not work so well, require longer guide-rods, and expose said rods to dust or moisture, causing them to rust and clog the cross-head, retard its motion, and materially destroy the efficiency of the mechanism.

It is also evident that a single guide-rod and accumulator-spring could be used in conjunction with my mechanism, instead of a pair of parallel springs, when not so much power is required. To apply this arrangement a single cross-head in conjunction with a forked connecting-rod or two plain connecting-rods embracing each a single end of the cross-head and parallel to each other could be advantageously used. Either of the above-described methods of accumulator-springs and connecting-rods may be used without departing from the spirit of my invention.

Having thus described the construction, arrangement, and operation of my invention, what I claim as new, and desire to secure by Letters Patent, is—

1. In a car-brake, the combination of a guide-rod secured to the car-frame, a cross-head adapted to slide longitudinally along said guide-rod, a spring arranged to force said cross-head along said guide-rod, a sprocket-wheel turning loosely on rear car-axle, a sprocket-spool turning loosely on forward car-axle, a chain connected thereto, and springs bearing against said cross-head, said chain engaging with sprocket wheel and spool, a clutch mounted on forward car-axle arranged to turn therewith, slide longitudinally thereon, and engage with said sprocket-spool, a clutch mounted on rear axle and adapted to turn thereon, and to engage with friction-disks firmly mounted and secured to axle, and mechanism for simultaneously operating said clutches, substantially as and for the purpose described.

2. In a car-brake, the combination of the horizontal parallel guide-rods secured to the car-frame, the cross-heads arranged to slide longitudinally thereon, the coiled accumulator-springs loosely encircling said guides and arranged to force said cross-head along them, a sprocket-wheel turning loosely on rear car-axle, sprocket-spool turning loosely on forward car-axle, a chain connected to and accumulator-springs bearing against said cross-head, said chain engaging with sprocket wheel and spool, a clutch mounted on forward car-axle arranged to turn therewith, slide longitudinally thereon, and to engage with the said sprocket-spool, a clutch mounted on rear axle and adapted to turn thereon and to engage with friction-disks, said disks firmly mounted on and secured to axle, and mechanism for simultaneously operating said clutches, substantially as and for the purpose set forth.

3. In a car-brake, the combination of two parallel guide-rods secured to car-frame, a cross-head adapted to slide longitudinally along said guide-rods, a coiled accumulator-spring loosely encircling said guide-rods and arranged to force said cross-head along them, a sprocket-spool turning loosely on car-axle, a chain connecting said sprocket to cross-head, clutches mounted on car-axle and arranged to turn therewith, slide longitudinally thereon, and to simultaneously engage with both ends of sprocket-spool, and mechanism for operating said clutches, substantially as and for the purpose described.

4. In a car-brake, the combination of a spring, a rod engaging with said spring, sliding longitudinally in bearings secured to car-frame and a fork secured thereto, a stop-lever fulcrumed on said fork, a spool turning loosely on car-axle and provided with annular flanges on which stop-lever arms rest, and a stop integral therewith, a clutch mounted on said axle and adapted to turn therewith, slide thereon, and to engage with said spool, and mechanism to operate said clutch, substantially as and for the purpose set forth.

5. In a car-brake, the combination of a guide-rod secured to car-frame, a cross-head adapted to slide along said guide-rods, a coiled accumulator-spring encircling said guide-rods and arranged to force said cross-head along them, a stop-lever, a rod connected to said stop-lever and adapted to engage with accumulator cross-head at a point near the end of its stroke, a spool turning loosely on car-axle and provided with annular flanges on which stop-lever arms rest, and a stop integral therewith, a chain connected to and a spring bearing against said accumulator-spring cross-head, said chain connected to spool, a clutch mounted loosely on car-axle arranged to turn therewith, slide longitudinally thereon, and to engage with aforesaid sprocket-spool, and mechanism for operating said clutch, substantially as and for the purpose set forth.

6. In a car-brake, the combination of a guide-rod secured to car-frame, a cross-head adapted to slide along said guide-rod, a coiled accumulator-spring encircling said guide-rods and arranged to force said cross-head along them, a stop-lever, a rod connected to said stop-lever and adapted to engage with accumulators at a point near the ends of their stroke, an auxiliary spring, a rod engaging with said auxiliary spring sliding longitudinally in bearings secured to car-frame, and a fork secured thereto, in which stop-lever is fulcrumed, a spool turning loosely on car-axle and provided with annular flanges on which stop-lever arms rest, and a stop integral therewith, a chain connected to and a spring bearing against said accumulator-spring cross-head, said chain connected to spool, a clutch mounted loosely on car-axle arranged to turn therewith, slide longitudinally thereon, and to engage with aforesaid sprocket-spool, and mechanism for operating said clutch, substantially as and for the purpose set forth.

7. In a car brake and starter, the combination of a cross-head 9, provided with the integral threaded boss 10, the casing 6, telescoping into casing 7 and threaded to receive boss 10, the casing 7, threaded and receiving washer 11, and the guide-rods receiving said washer and secured to car-frame, substantially as and for the purpose set forth.

8. In a car-starter, the combination of a guide-rod secured to the car-frame, a cross-head adapted to slide longitudinally along said guide-rod, a spring arranged to force said cross-head along said guide-rod, a gravity-clutch arranged to engage, when moving in one direction only, with a disk secured to car-axle, and means for connecting said gravity-clutch to said cross-head, substantially as and for the purpose described.

9. In a car-starter, the combination of the horizontal parallel guide-rods secured to the car-frame, the cross-head adapted to slide longitudinally thereon, the coiled accumulator-springs loosely encircling said guide-rods and arranged to force said cross-head along them, the clutch arranged to engage, when moving in one direction only, with the adjacent disks secured to car-axle and turning therewith, and means for connecting said clutch to said cross-head, substantially as and for the purpose described.

10. In a car-starter, the combination of a guide-rod secured to car-frame, a cross-head adapted to slide longitudinally along said guide-rods, a coiled accumulator-spring loosely encircling said guide-rod and arranged to force said cross-head along it, a gravity-clutch arranged to engage, when moving in one direction only, with its adjacent engaging-disks secured to car-axle and turning therewith, and means for connecting said gravity-clutch to said cross-head, substantially as and for the purpose set forth.

11. In a car-starter, the combination of a guide-rod secured to the car-frame, a cross-head adapted to slide along said guide-rod, a coiled accumulator-spring encircling said guide-rod and arranged to force said cross-head along it, an auxiliary spring encircling a guide-rod, said guide-rod arranged to slide in suitable bearings in frame, a connecting-rod secured to auxiliary guide-rod at one end and adapted to engage with accumulator-spring cross-head at a point near the end of its stroke, a clutch arranged to engage, when moving in one direction only, with its adjacent engaging-disks, said disks secured to and turning with car-axle, and means for connecting said clutch to said cross-head, substantially as and for the purpose described.

12. In a car brake and starter, the combination of the guide-rod 8, spring 5, cross-head 9, connecting-rod 15, chain 20, disks 45 and 46, secured to car-axle, sprocket 42, carrying pawls 43 and the stop-pins 44, substantially as and for the purpose set forth.

13. In a car brake and starter, the combination of the guide-rods 8, the springs 5, the cross-head 9, connecting-rod 15, chains 23, 28, and 29 and their connecting-rods 21, 27, 30, and 31, said rods 27, 30, and 31 provided at their rear ends with the distance-rods 25 and 26, for the purpose described and shown, the sprocket 42, carrying pawls 43 and the stop-pin 44, disks 45 and 46, of the character described and shown, secured to car-axle, clutches 47 and 48, axles 3 and 4, spool 35, clutches 37, and toggle-frames arranged to simultaneously operate said clutches 37, 47, and 48, substantially as and for the purpose set forth.

14. In a car brake and starter, the combination of the guide-rods 8, the springs 5, the cross-head 9, connecting-rod 21, stop-lever 53, connecting-rod 58, chains 20, 23, 28, and 29 and their connecting-rods 21, 27, 30, and 31, said rods 27, 30, and 31 provided at their rear ends with the distance-rods 25 and 26 for the purpose described and shown, the sprocket 42, carrying the pawls 43 and stop-pin 44, disks 45 and 46, secured to car-axle, clutches 47 and 48, axles 3 and 4, spool 35, provided with flange 81 and stop 80, clutches 37, and toggle-frame arranged to simultaneously operate said clutches 37, 47, and 48, substantially as and for the purpose set forth.

15. In a car brake and starter, the combination of the guide-rods 8, springs 5, cross-head 9, connecting-rod 21, draw-bar 55, auxiliary spring 56, fulcrum 54, secured to said draw-bar, stop-lever 53, and rod 58, jointed thereto in a manner to maintain arms of stop-lever in contact with spool-flange 81, and provided with a catch at its rear end, chains 20, 23, 28, and 29 and their connecting-rods 21, 27, 30, and 31, distance-rods 25 and 26, sprocket 42, carrying pawls 43 and stop-pin 44, disks 45 and 46, clutches 47 and 48, axles 3 and 4, spool 35, provided with flange 81 and stop 80, clutches 37, and toggle-frame arranged to simultaneously operate said clutches 37, 47, and 48, substantially as and for the purpose described.

16. In a car brake and starter, the toggle-frames 68 and 69, of the form described and shown, adjustable cross-braces 74, 75, 76, and 77, connected to said toggle-frames, toggles 69, clutch-straps 71, having their top members prolonged, as described, clutches 37, 47, and 48, angle-brace 67, connecting said toggle-frame to intermediate lever 64, fulcrumed in fulcrum-brace 65 and guided at its outer end by the brace-guides 66, toggle-frame collars secured to and turning with car-axles, the adjustable connecting-rod 63, the brake-rod 59, carried by the standard 60 and having the eccentric 62, all in combination, substantially as and for the purpose described.

17. In a car brake and starter, the combination of the guide-rods 8, springs 5, cross-head 9, connecting-rod 21, draw-bar 55, auxiliary spring 56, fulcrum 54, secured to said draw-bar, stop-lever 53, and rod 58, jointed thereto for the purpose described, and provided with a catch at its rear end, chains 20, 23, 28, and 29 and their connecting-rods 21, 27, 30, and 31, distance-rods 25 and 26, sprockets 42, carrying pawls 43 and stop-pins 44, disks 45 and 46, axles 3 and 4, clutches 37, 47, and 48, toggle-frame 68 and 69, adjustable braces 74, 75, 76, and 77, toggles 69, clutch-straps of the character described and supported by their adjacent cross-braces, angle-brace 67, toggle-frame collars secured to and turning with car-axles, intermediate lever 64 and its fulcrum 65 and guide 66, adjustable brake-rod 63, and brake-rod 59, its standard 60, and eccentric 62, secured thereto, all combined substantially as and for the purpose set forth.

In testimony whereof I have hereunto set my hand in the presence of two subscribing witnesses.

ALFRED B. ARNOLD.

Witnesses:
A. C. BRAZINGTON,
W. C. BRAZINGTON.